Nov. 17, 1970 C. F. CHUBB, JR 3,541,561
HIGH-SPEED SCANNER IN WHICH A FEED ARM IS PIVOTALLY
MOUNTED WITH AND ANGULARLY MOVABLE FROM
A COMPLEMENTARY COUNTER-BALANCE ARM
Filed April 17, 1968 2 Sheets-Sheet 1
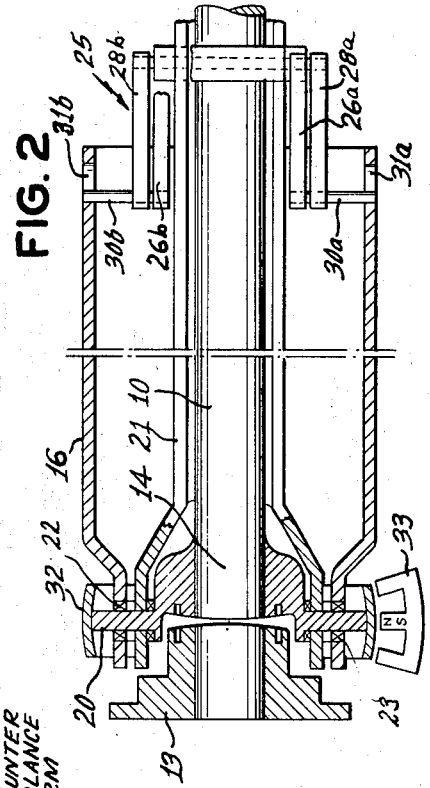
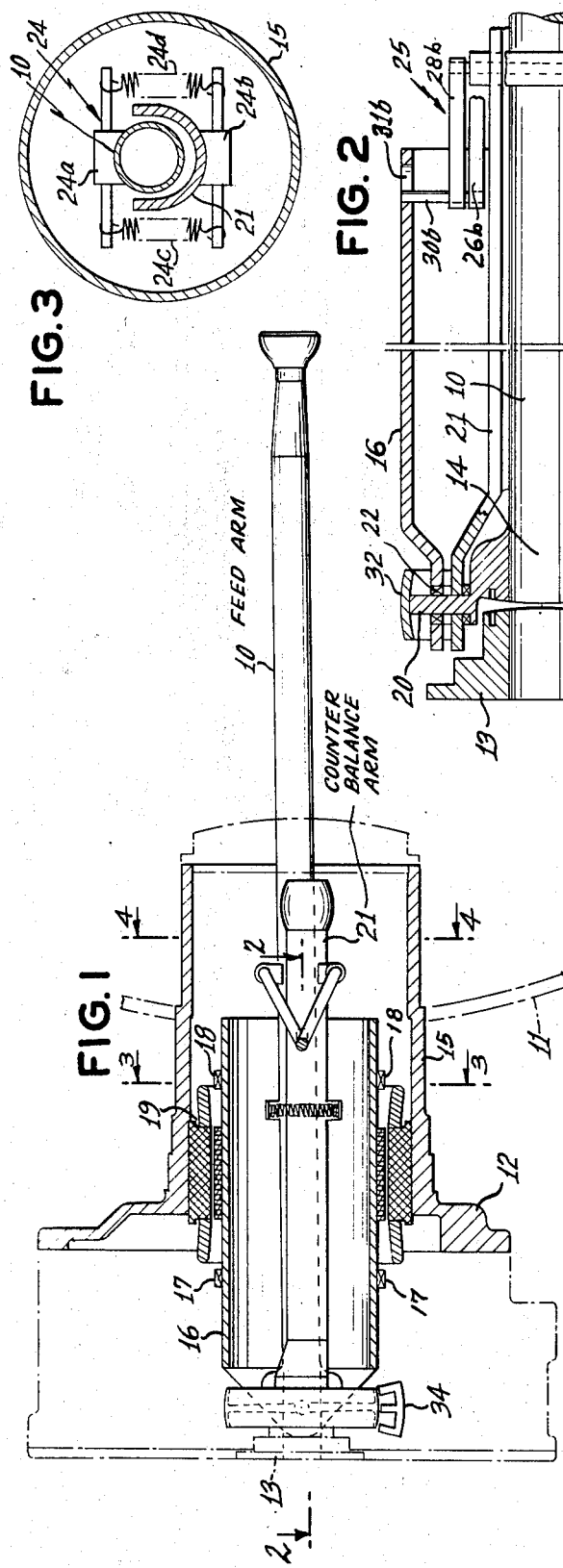
INVENTOR.
Charles F. Chubb, Jr.
BY
McGregor & Eiseman
ATTORNEYS

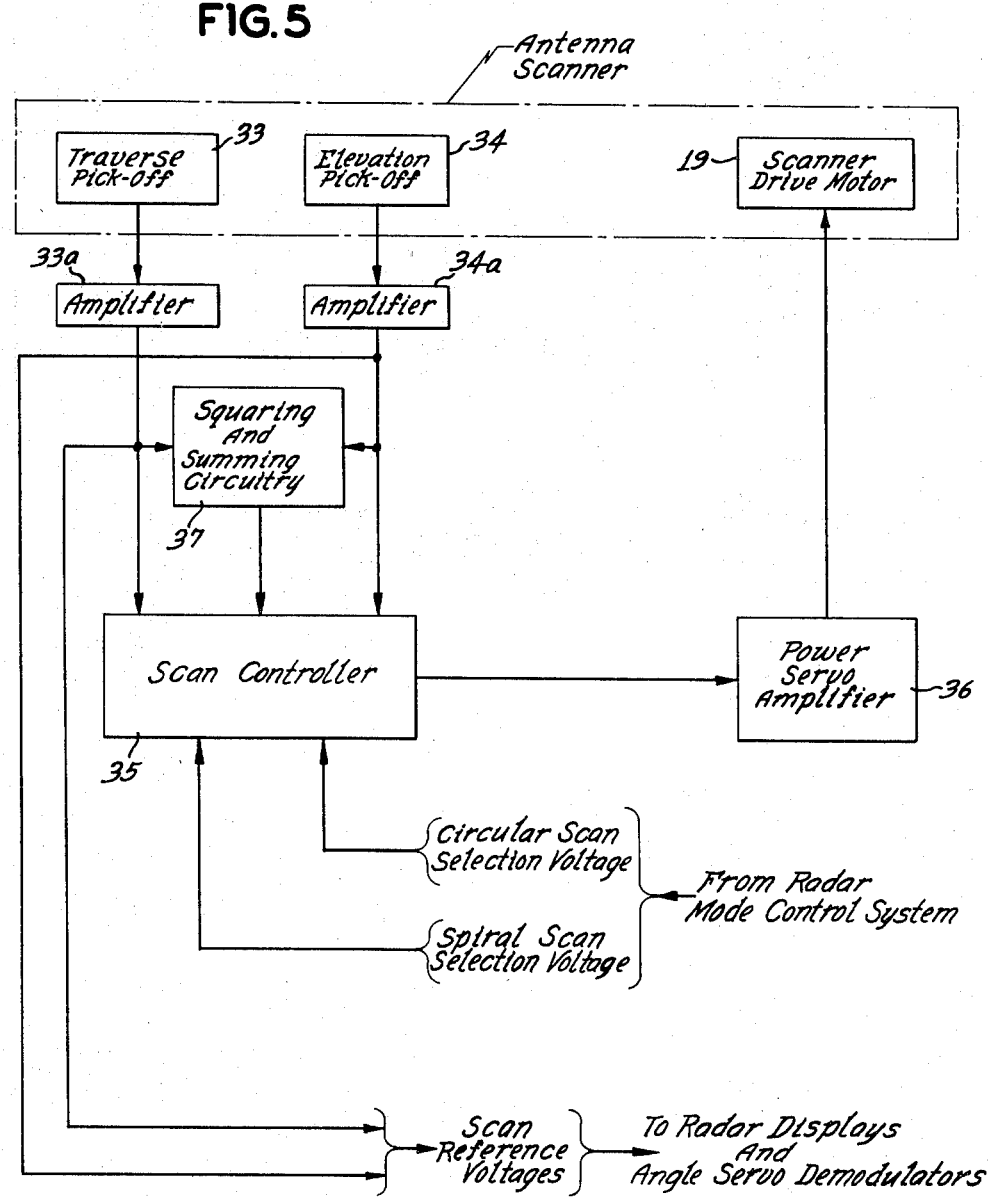

United States Patent Office
3,541,561
Patented Nov. 17, 1970

3,541,561
HIGH-SPEED SCANNER IN WHICH A FEED ARM IS PIVOTALLY MOUNTED WITH AND ANGULARLY MOVABLE FROM A COMPLEMENTARY COUNTER-BALANCE ARM
Charles F. Chubb, Jr., Glen Head, N.Y., assignor to Dynell Electronics Corporation, Plainview, N.Y., a corporation of New York
Filed Apr. 17, 1968, Ser. No. 722,005
Int. Cl. H01q 3/00, 3/10, 3/12
U.S. Cl. 343—757                                  9 Claims

ABSTRACT OF THE DISCLOSURE

A high-speed scanner for achieving selectively controlled spiral and circular scan patterns in a dynamically balanced system in which the feed arm for the radiant energy is pivotally mounted with a complementary counter-balance arm and in which the two arms are angularly movable in different directions against a spring force for a distance determined by the speed of rotation of assembly and in which pick-offs which can work through a servo loop measure the position of the antenna feed and control the torque of the rotary device.

BACKGROUND OF THE INVENTION

The present invention relates to scanners for radiant energy and, in particular, to scanners in which circular and spiral scan patterns can be controllably and selectively achieved.

In the past, scanning mechanism for radiant energy, such as radar scanners, infrared scanners and laser scanners, has had a relatively short operating life and poor reliability due to complex mechanical linkages including high-speed gears, heavily loaded bearings, clutches, oil seals and other parts with tight mechanical tolerances.

Accordingly, the present invention has for its principal object to provide an efficient, reliable mechanism for effecting various scan patterns.

Another object of the invention is to provide a scanner which can achieve by means of electronic control a variety of scan patterns using a reduced number of parts including relatively light bearings and avoiding the use of clutches, gears, slip rings, oil seals and other mechanical devices which are subject to failure under hard or extended use.

SUMMARY OF INVENTION

In accordance with the present invention, there is provided a scanner including complementary pivotally-mounted antenna feed and counter-balance arms. The two arms are mounted on a common pivot axis in a rotary carrier member affording clearance so that they are free to deflect or diverge outwardly from the axis of rotation of the cylinder. The two arms are biased toward each other against a mechanical stop by a spring assembly which holds the feed arm in a slightly offset position appropriate for conical scanning. The rotary cylinder is in turn mounted in bearings, which because the system has relatively low mass and is dynamically balanced, can be of lightweight construction. The carrier member is adapted to be driven by a hollow-shaft induction motor. Electromechanical pick-offs are provided for both azimuth and elevation positions and the scan pattern, based on the deflection angle of the feed arm is electronically controlled through a servo loop driving the motor. A spiral-scan signal, for example, will unbalance the servo loop to speed up the drive motor causing the feed and balance arms to diverge against the restraining spring while the assembly is accelerating and all assume a desired position under constant speed conditions. Linkages from each of the pivotally mounted arms are provided to equalize the deflections of the arms from the axis of rotation.

The invention including various features and advantages thereof will be apparent from the following specification describing a preferred embodiment thereof, taken in conjunction with the accompanying drawing.

BRIEF DESCRIPTION OF DRAWINGS

FIG. 1 is a view in side elevation and taken partly in vertical section showing a radar scanner assembly in its minimum or conical scan angle position;

FIG. 1A is a view in side elevation partly in vertical section corresponding to FIG. 1 but showing the radar scanner in its maximum or circular scan angle position;

FIG. 2 is a view in enlarged scale taken on the line 2—2 of FIG. 1 looking in the direction of the arrows;

FIG. 3 is a view in transverse section taken on the line 3—3 of FIG. 1 looking in the direction of the arrows;

FIG. 4 is a view in transverse section taken on the line 4—4 of FIG. 1 looking in the direction of the arrows; and FIG. 5 is a block diagram of the electrical control system for the antenna scanner.

DESCRIPTION OF THE PREFERRED EMBODIMENT

Referring to the drawings, and to FIGS. 1 and 2 in particular, the invention is illustrated as embodied in a radar scanner including a tubular feed arm 10 which is the radiating and receiving element of the antenna assembly, and which is disposed close to the focal point of a reflector indicated diagrammatically by the numeral 11. The reflector 11 can take the form of a conventional parabolic reflector carried by a fixed or base mounted housing portion 12. The rearward portion of the housing 12 has coupled thereto a microwave waveguide 13 which couples coaxially with the inner end 14 of the feed arm 10 in a swivel coupling. The feed arm is a circular wave guide and a rectangular to circular transition can be used for coupling to a conventional radar.

The forward end 15 of the frame portion 12 is tubular and has mounted therein a hollow rotor assembly 16 supported in bearings 17 and 18, which are frame or base supported by means not shown. The hollow rotor 16 is driven by a hollow-shaft induction motor 19, the stator portion of which is secured within the tubular portion 15. Pivotally mounted at the inner end of the rotor assembly 16 by means of a pivot shaft 20 is the feed arm 10 as well as a counter-balance arm 21, the pivot shaft being supported in bearing assemblies 22 and 23. By this pivot or hinge mount, the feed arm 10 and the counter-balance arm 21 are capable of swinging away from each other in a divergent motion about a common axis. The counter-balance arm includes a weight 21a. A weight 10a (shown in phantom lines) may be used with the arm 10 for better dynamic balance.

As best seen in FIG. 3, the two arms are spring biased toward each other by means of a tension spring assembly 24 including upper and lower bridge pieces 24a and 24b joined by a pair of tension springs 24c and 24d. The feed and counter-balance arms are stabilized and controlled in their limit positions by an articulated or pantograph linkage 25, including a first pair of pivot arms 26a and 26b pivotally secured to a mounting member 27 attached to the upper surface of the feed arm 10, and a second pair of pivot arms 28a and 28b pivotally secured to the underside of the counter-balance arm 21 by a mounting member 29, which is secured to the underside of the feed arm. The respective pairs of pantograph arms are tied together by short pivot shafts 30a and 30b which extend laterally to be received in slots 31a and 31b respectively, formed in the side wall of the hollow rotor 16.

When the feed and counter-balance arms are in their innermost position representing the position of minimum scan angle called conical scan, as shown in FIG. 1, the pivot shafts 30a and 30b will engage the inner or left hand end of the slots 31a and 31b, and when the arms are in their maximum divergent angle, called circular scan, as shown in FIG. 1A, the pivot shafts will engage the outer ends of the slots. In a typical radar system, an angle on the order of one or two degrees obtains between the arms at the innermost position and an angle of about ten degrees when at the outermost or divergent position.

Carried by the inner end of the feed arm and movable therewith is the movable portion 32 of a position indicator mechanism for measuring the angle of the feed arm. The member 32 is ferromagnetic and operates in conjunction with a pair of E pick-off transformer members 33 and 34, one measuring the angle to the vertical and the other the horizontal in attitude and azimuth. The transformer pick-off elements 33 and 34 are secured to the frame by support means not shown.

Referring to FIG. 5, there is illustrated a block diagram of the electrical control system for the scanner. The control system is connected to the traverse and elevation pick-off elements 33 and 34 and to drive motor 19 and includes amplifiers 33a and 34a to amplify respectively the scan position signals from the traverse and elevation pick-off elements 33 and 34, respectively, a scan controller 35 to generate the appropriate speed or torque control signals and a power servo amplifier 36 to amplify the control signals to the power levels required to control the drive motor.

In operation, if neither of the scan selection voltages are applied, the scan controller will generate the appropriate control signals to the scanner drive motor to cause it to run at the proper constant speed at which the feed arm remains against its inner stop, i.e., the left hand end side of the slots 31a and 31b (FIG. 2), and representing the conical scan position. This speed control function is instrumented by comparing the amplified pick-off voltages with an appropriate frequency reference circuit (not shown) located in the scan controller 35. If the rotation rate of the scanner is slow in relation to the reference frequency, the scan controller operates to generate a control signal to increase the motor speed and if the scanner speed is too high, the controller will generate a signal to reduce the driving torque of the motor, causing it to slow down.

It will be understood that other conventional control devices can be used for this speed control, such, for example, as a tachometer feedback of the type commonly used in the servo art. Also, if desired for the purpose of accommodating severe loadings which might occur if the feed arm 10 were loaded with ice, a supplemental override circuit can be included to overpower the frequency control signal and force the scanner drive motor to slow down and thus prevent the feed arm from spiraling out prematurely or unintentionally. Thus, the conical scan can be maintained under a variety of conditions.

When the radar control system calls for a spiral scan, a spiral scan voltage is introduced into the scan controller 35 to cause the scanner drive motor to speed up. When the scan speed reaches the proper value the centrifugal forces on the scanner feed arm 10 and the balance arm 21 will cause the arms to diverge against the force of the spring 24 with the outer or radiating end of the scanner arm tracing a spiral until it reaches the outer limit stop by the pins 30a and 30b engaging the right hand ends of their respective slots 31a and 31b. When this point in the spiral scan is reached, as indicated by the increased amplitudes of the traverse and elevation pick-off voltages (or by the rate of change of these voltages), the scan controller will reverse the control signal so as to reverse the torque on the scanner drive motor causing it to slow down. This process will result in the kinetic energy stored in the scanning feed and balance arms 10 and 21 and the potential energy stored in the springs 24 to be dissipated, thus causing the feed arm to move in an inward spiral scan until it reaches the inner limit stop (the left hand ends of the slots 31a and 31b).

As in the case of the extreme outer position, the scan controller will sense this point from the amplitudes or rates of change of amplitudes of the traverse and elevation pick-off voltages and will again operate to increase the torque of the drive motor to cause the feed arm 10 to spiral outwardly. This process continues as long as the spiral cam selection voltage is applied.

It will be understood that other techniques can be used to effect this action of the scan controller. For example, the vector can scan radius or its square can be computed and compared continuously with a scan reference voltage generated in the controller and the difference used as an error voltage to generate the torque control signal for the drive motor. Alternatively, an open loop control voltage can be generated to cause the scanner drive motor to accelerated and decelerate to effect the spiral scan of the feed arm 10.

When the circular scan selection voltage is applied to the scan controller 35 the scan controller will produce signals to drive the feed arm 10 in an outward spiral to its outer limit and will then maintain a scan speed sufficient to hold the feed arm in its outer position, thereby effecting a so-called circular scan. A control system for this mode can be similar to that for the conical scan mode except the reference frequency will be different and an override circuit, if used, will operate to prevent the scan radius from falling below an appropriate maximum radius.

In the various modes of operation, it is desirable to have a voltage representing either the scan radius or the square of the scan radius. The latter can be generated by squaring the traverse and elevation pickoff voltages by appropriate non-linear circuitry, such, for example, by the use of diode networks and summing the resulting voltages, such conventional circuitry being indicated by the numeral 37 in FIG. 5.

While preferred embodiments of the invention have been described and illustrated above, it will be understood that the invention can take various other forms and arrangements within the scope of the art. For example, the spring biasing assembly 24 including the helical springs 24c and 24d can be replaced by a leaf spring or wishbone spring. If the latter is used, it can be restrained at its closed or base end so that it moves only in a direction parallel to the spin axis, in which case the spring can also perform the functions of the articulated linkage 25, thus simplifying the overall mechanism. Also, if desired, the use of guide slots 31a and 31b can be eliminated by using a second set of linkage bars lying in a plane approximately perpendicular to the spin axis and terminating in ball joints on the rotating cylindrical member 16, and providing suitable limit stop bumpers in the hollow rotor 16.

Also, if desired, other types of motors can be used, such, for example, as D.C. motors, synchronous motors and, in general, any motor whose speed can be varied within desired limits. Also, if desired, a simplified control system can be used, such, for example, as a bang-bang servo system in which the presence of the feed arm 10 at either limit stop is sensed by means of a switch, magnetic sensor, or other sensing device, and the scanner can be held in its range of scan positions by effectively turning the motor on or off in order to keep the feed arm working slightly in and out of the appropriate limit stop position. In order to make the feed arm spiral scan outward, the motor is turned on, and in order to achieve a spiral scan inward, the motor is dynamically braked.

Also, various other types of pickoff systems can be used, such as capacitor or optical pickoffs. Lastly, it will be understood that the basic scanner can be used with various radiation devices, such as radars, lasers, infrared or optical devices, high frequency microwave radiators or pickup systems, all with their associated focusing devices, such as reflectors, lenses or the like, which can be either mounted on the frame or carried by the scanning feed arm itself. The invention should not, therefore, be regarded as limited except as defined by the following claims:

I claim:
1. In a scanner system for radiant energy, a feed arm for transmitting and receiving radiant energy and means for driving the feed arms to establish variable scan patterns comprising a rotary member, means connecting the feed arm to the rotary member to rotate therewith and for angular movement with respect to the axis of rotation thereof, means to rotate the member about an axis, and means to control the angular position of the feed arm relative to the axis including a counter-balance arm mounted for angular movement toward and away from the axis and carried by the rotary member, the feed and counter-balance arms being disposed with their centers of gravity on opposite sides of the axis and adapted for divergent angular movement between inner and outer extreme positions.

2. Apparatus as set forth in claim 1, including resilient means connecting the feed and counter-balance arms and urging them toward one of said extreme positions.

3. Apparatus as set forth in claim 1, including radiation focusing means associated with the feed arm.

4. Apparatus as set forth in claim 2, said means to rotate the rotary member including speed controllable motor means, and control means to energize the motor means to drive the rotary member at a range of angular speeds between a maximum speed which the feed and counter-balance arms are forced to a maximum divergent angle and a minimum speed at which the arms are disposed at a minimum divergent angle.

5. Apparatus as set forth in claim 6, said control means including means to controllably accelerate the rotary member between minimum and maximum speeds to cause the feed arm to trace controlled outward and inward spirals.

6. Apparatus as set forth in claim 1 including means to define the minimum and maximum divergent angles of the feed and counter-balance arms comprising articulated links connecting the arms and having a common pivot pin movable in translation as the arms diverge and converge, and stop means to limit the travel of the pivot pin in either direction of travel.

7. Apparatus as set forth in claim 1, said feed and counter-balance arms having a common pivot axis in said rotary member which is normal to the axis of rotation of the rotary member, and electromagnetic pick-off means to measure the angular position of the feed arm relative to said axis.

8. Apparatus as set forth in claim 7, said pickoff means including azimuth and elevation pickoffs and means to connect the pickoffs to the control means in a servo loop.

9. Apparatus as set forth in claim 8, said rotary member being hollow and said motor means surrounding the rotary member coaxially therewith.

References Cited

UNITED STATES PATENTS

| | | | |
|---|---|---|---|
| 2,710,352 | 6/1955 | Getting et al. | 343—759 X |
| 2,916,739 | 12/1959 | Falstrom | 343—761 |
| 2,936,452 | 5/1960 | Reinhard et al. | 343—757 |

HERMAN KARL SAALBACH, Primary Examiner

T. VEZEAU, Assistant Examiner

U.S. Cl. X.R.

343—759, 761, 766; 74—86

UNITED STATES PATENT OFFICE
CERTIFICATE OF CORRECTION

Patent No. 3,541,561                     Dated   Nov. 17, 1970

Inventor(s)     Charles F. Chubb, Jr.

It is certified that error appears in the above-identified patent and that said Letters Patent are hereby corrected as shown below:

| | | |
|---|---|---|
| In the Abstract, last line, | "device" should be --drive--; | |
| Col. 1, last line, | "all" should be --will--; | |
| " 4, line 16, | "can" should be cancelled; | |
| " 4, " 22, | "accelerated" should be --accelerate--; | |
| " 5, " 13, | "arms" should be --arm--; | |
| " 6, " 1, | "claim 6" should be --claim 4--. | |

SIGNED AND
SEALED
MAR 9 1971

(SEAL)
Attest:

Edward M. Fletcher, Jr.
Attesting Officer

WILLIAM E. SCHUYLER, JR.
Commissioner of Patents